W. SMITH.
GRAIN SAVER ATTACHMENT FOR REAPERS.
APPLICATION FILED MAY 12, 1915.

1,157,435.

Patented Oct. 19, 1915.
2 SHEETS—SHEET 1.

WITNESSES:

INVENTOR
WALTER SMITH,
BY Munn & Co.
ATTORNEYS

W. SMITH.
GRAIN SAVER ATTACHMENT FOR REAPERS.
APPLICATION FILED MAY 12, 1915.
1,157,435.
Patented Oct. 19, 1915.
2 SHEETS—SHEET 2.
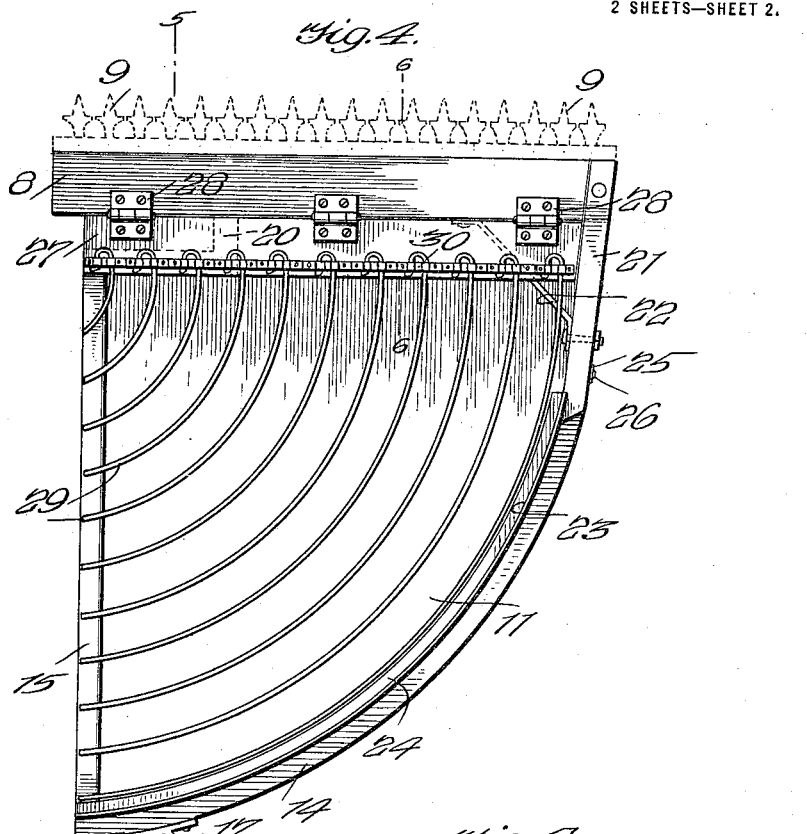
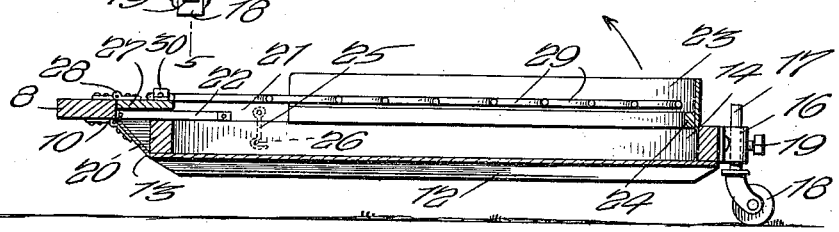
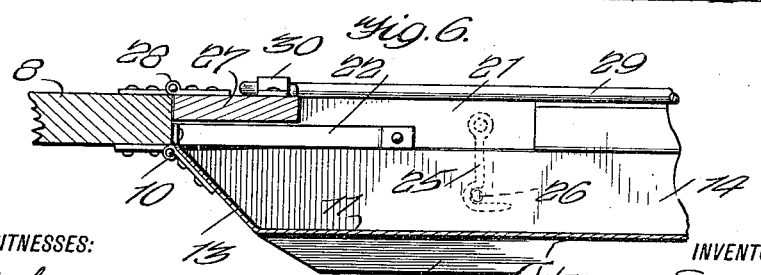
WITNESSES:
INVENTOR
WALTER SMITH,
BY Munn & Co.
ATTORNEYS

UNITED STATES PATENT OFFICE.

WALTER SMITH, OF GILMAN, ILLINOIS.

GRAIN-SAVER ATTACHMENT FOR REAPERS.

1,157,435.  Specification of Letters Patent.  Patented Oct. 19, 1915.

Application filed May 12, 1915. Serial No. 27,568.

*To all whom it may concern:*

Be it known that I, WALTER SMITH, a citizen of the United States, and a resident of Gilman, in the county of Iroquois and State of Illinois, have invented certain new and useful Improvements in Grain-Saver Attachments for Reapers, of which the following is a specification.

This invention relates to an improvement in grain saving devices for reapers and harvesters, and one of the principal objects of the invention is to provide such a device in the nature of an attachment adapted to be utilized in the place of the ordinary grain platform commonly in use.

It is well known that when sweet clover and other similar small grain is harvested with the ordinary reaper equipped with a solid platform, about half of the seed is shattered loose from the stems, and when the gavel or bunch of clover is swept from the platform to the ground, practically all of the seed so shattered or shaken from the stalks falls to the ground and is lost.

In harvesting sweet clover and similar small grains for seed, with a self-binding grain harvester, a large proportion of the seed is jostled out onto the platform apron, and while the stalks of the grain are passed to the elevating apron from the platform apron, the seed which has been shattered upon the platform apron, does not so pass to the elevating apron but is dropped to the ground and lost through the space occurring between the platform and the elevating aprons.

One of the primary objects, therefore, of the present invention is to provide a means in the nature of an attachment, to be utilized in place of the ordinary solid platform, for catching the grain ordinarily wasted.

A still further object of the invention is to provide a device of the class described which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawings in which like characters of reference indicate like parts throughout the several figures, of which—

Figure 1:
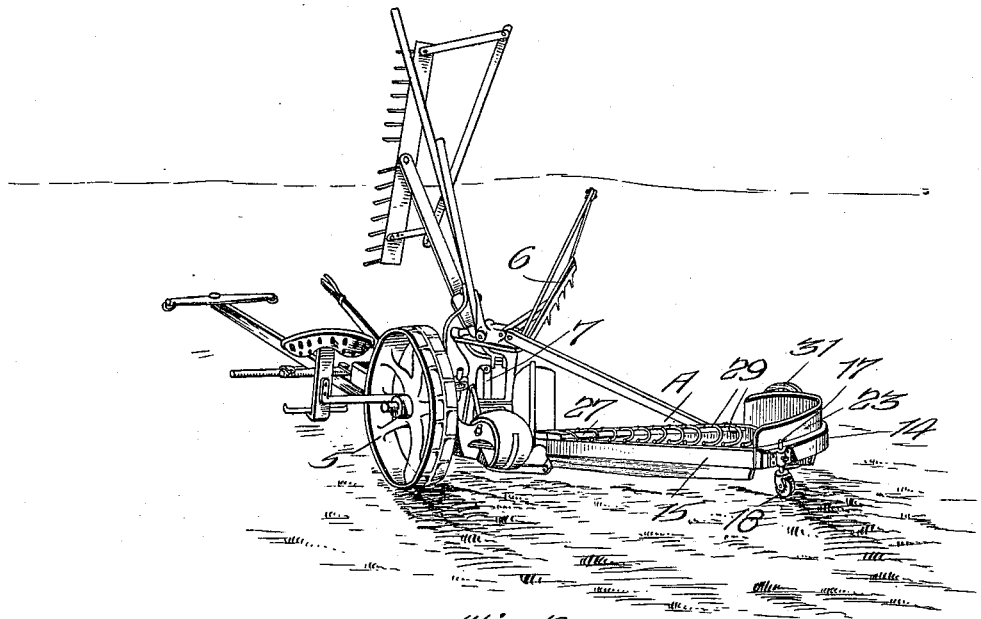
Figure 2:
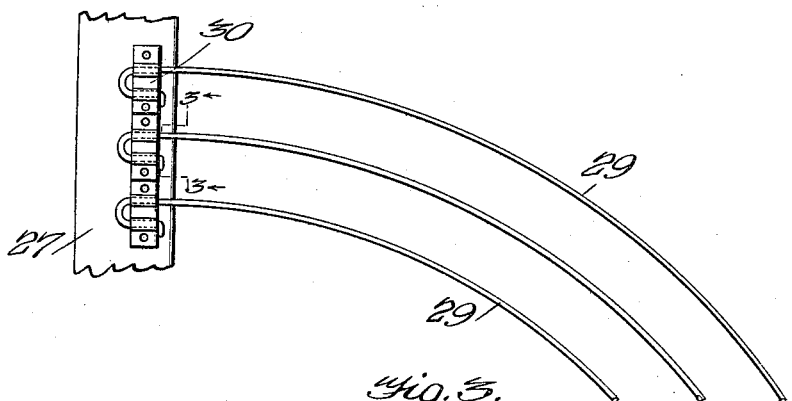
Figure 3:
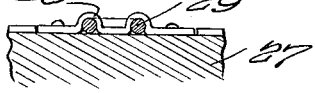

Figure 1 represents a view in perspective of a reaper equipped with my improved grain saving device, looking at the same from the rear thereof. Fig. 2 represents a fragmentary view in plan of a number of the fingers, showing the manner in which they are connected with the frame of the attachment. Fig. 3 represents a view in section taken on the plane indicated by the line 3—3 of Fig. 2. Fig. 4 represents a plan view of the grain saving attachment. Fig. 5 represents a view in section taken longitudinally thereof, on the plane indicated by the line 5—5 of Fig. 4. Fig. 6 represents a fragmentary view in section taken longitudinally on the plane indicated by the line 6—6 of Fig. 4.

Referring more particularly to the drawings, I have indicated in Fig. 1 a reaper of a well known type equipped with a grain saver constructed according to my invention. The bull wheel of the reaper is indicated at 5, and at 6 are indicated the arms or rakes which are adapted to be driven through the operation of the shafting designated at 7. The improved seed saving attachment is indicated generally by the letter A. It is adapted to be utilized in place of the ordinary solid platform, and includes a plate 8 to which the sickle bar indicated generally at 9, is adapted to be connected. Connected along its forward edge to the rear edge of the plate 8 through the medium of hinges 10, is a pan or receptacle 11 which is generally in the form of a quadrant. On its lower face this pan is provided with a plurality of reinforcing strips 12. The forward edge of the pan, or that adjacent the plate 8, is inclined upwardly as at 13, in order that the stubble may be readily depressed or bent over as the pan moves across the same. Along the outer curved edge of the pan, is secured an arcuate strip of suitable material 14, and along the rear straight edge of said pan is secured another similar strip 15. These strips respectively form the side and rear end walls of the receptacle. If preferable, these walls may be formed by properly stamping or shaping the pan out of suitable metal, rather than have them formed of separate pieces secured to the pan. Adjacent the rear end of side wall 14, is secured a sleeve 16 for the reception of a stem 17 on which a wheel 18 is carried. A set screw 19 carried by sleeve 16 serves as means whereby the wheel 18 may be adjusted relatively to the pan in order to vary the height of the latter. The wheel is swivelly connected with the pan in order that it may follow the course of travel of the reaper. The inner corner of the pan adjacent the inner end of plate 8, is cut away for the reception of a brace (not shown) which connects the plate 8 with the framework of the reaper. This cut-away portion is defined by a boxing 20 adapted to prevent loss of seed from the receptacle at this point. Securely affixed to the outer end of plate 8 and extending rearwardly over the forward end of the curved wall 14, is an arm 21. The latter is connected by means of a brace 22 with said plate in order to provide a firm and unyielding structure. This arm carries a rail 23 in the nature of a strip of suitable material, such as sheet metal, which extends along the upper edge of the curved side wall 14. A curved strip 24 is secured along the inner face of the rail 23 adjacent the lower edge of the latter and serves to brace this rail and maintain the latter in proper position.

The arm 21 is provided with a hook or latch 25 adapted to be connected with a suitable retaining pin or catch 26 carried by the side wall 14, whereby the pan or receptacle may be maintained in fixed raised position relatively to the plate 8. Along the rear edge of this plate 8 and flush with the upper surface thereof, is connected a leaf 27 through the medium of a plurality of hinges 28. The leaf may be raised and lowered therefore, relatively to the plate, and to the pan or seed receptacle. Connected in fixed relation to each other and to the leaf 27 is a plurality of rearwardly extending arms or fingers 29. The latter are arcuate in formation as indicated clearly in Fig. 4, and of a curvature conforming to the curvature of the outer edge of the receptacle or pan, the curve along which the fingers lie, preferably having the shafting 7 which drives the arms or rakes, as a center.

Each of the fingers 29 is connected at its inner end to the leaf 27 by means of a suitable clip 30. These fingers are each bent into a substantially U-shape at their inner ends, and the clips fitted over the bowed or bent ends in the manner indicated in Fig. 2 and then securely fastened to the leaf. Each of the clips is provided with a bowed or channeled portion for receiving the bent end of the finger as indicated in Figs. 2 and 3. By having the fingers 29 hingedly connected with the receptacle, they may readily be lifted whereby to allow access to the receptacle in removing the seed therefrom. The rear ends of the fingers or bars 29 rest upon and are supported by the rear end wall 15 of the seed receptacle.

If found desirable, the apparatus might be constructed by having the pan or seed receptacle rigidly connected to the plate 8 and arm 21, and by dispensing with the wheel 18 at the rear end of the receptacle. In this case the weight of the seed in the pan will be carried by the framework connecting the bull wheel 5 and grain wheel 31. As the grain is cut, it falls upon the fingers 29, and any seed that may be shaken or jostled from the stalks, will fall into the pan and be retained by the latter until such time as it is desired to remove the seed.

Although I have described the preferred embodiment of my invention, I may desire to make such changes in the construction, combination, and arrangement of parts thereof, as do not depart from the spirit of the invention and the scope of the appended claims.

I claim:—

1. A grain saving device for reapers including a plate connected with the framework of a reaper and supporting a sickle bar, a quadrant shaped receptacle hingedly connected along one of its straight edges to said plate and having an inclined forward edge, said receptacle being provided with a plurality of reinforcing members and with a caster wheel adjustably connected to the receptacle, an arm carried by the said plate, means for detachably connecting the receptacle to the arm, said receptacle being provided along its outer and rear edges with respectively curved and straight strips forming the side and rear walls of the receptacle, a rail carried by said arm and extending along the curved edge wall of the receptacle, a leaf hingedly connected with said plate, and a plurality of spaced rearwardly extending arcuate fingers arranged concentrically with the outer edge of the receptacle and rigidly connected with the leaf and extending over the receptacle and resting upon the rear wall thereof.

2. In a grain saving device for reapers, a plate connected with the framework of a reaper and providing a support for a sickle bar, a quadrant shaped receptacle hingedly connected along one straight edge with the plate, means whereby the receptacle may be detachably connected in fixed relation with the plate, a caster wheel adjustably connected with the receptacle, a leaf hingedly connected with said plate, and a plurality of arcuate fingers carried by the leaf and extending over said receptacle, said fingers being concentric with the curvature of the outer edge of the receptacle.

3. A device of the class described including a plate connected with the framework of a harvester and supporting a sickle bar, a quadrant shaped receptacle hingedly connected along one straight edge with the plate, means whereby the receptacle may be detachably maintained in fixed position relatively to the plate, a caster wheel adjustably connected with the receptacle, and a plurality of arcuate arms hingedly connected with the plate and bridging the receptacle and being concentric with the outer edge of the receptacle.

4. A device of the class described including a plate connected with a harvester, a substantially quadrant-shaped receptacle hingedly connected with the plate along one straight edge, and a plurality of curved arms concentric with the curvature of the outer edge of the receptacle and connected with the plate and overlying said receptacle, substantially as described.

WALTER SMITH.

Witnesses:
 JOSEPH K. MONTELIUS,
 BERT HANNA.

Copies of this patent may be obtained for five cents each, by addressing the "Commissioner of Patents, Washington, D. C."